United States Patent [19]

Ercoli et al.

[11] 3,833,489

[45] Sept. 3, 1974

[54] PROCESS FOR THE PREPARATION OF SQUARIC ACID BY REDUCTIVE CYCLOTETRAMERIZATION OF CARBON MONOXIDE

[76] Inventors: Raffaele Ercoli, 49, Via G. Campolo; Giuseppe Silvestri, 48, Via Emilia; Salvatore Gambino, 31, Via L. Ruggieri; Mauro Guainazzi, 70, Via Cavour; Giuseppe Filardo, 16/A, Via Svezia, all of Palermo, Italy

[22] Filed: July 18, 1972

[21] Appl. No.: 272,741

[30] Foreign Application Priority Data
July 24, 1971 Italy .................................. 42019/71
June 6, 1972 Italy .................................. 25273/72

[52] U.S. Cl. ........... 204/59 QM, 204/59 R, 204/72, 260/585.5, 260/586 R

[51] Int. Cl... C07b 29/06, C07c 35/04, C07c 49/45
[58] Field of Search ..................... 260/585.5, 586 R; 204/59 R, 59 QM, 72

[56] References Cited
UNITED STATES PATENTS
3,059,030   10/1962   Park et al ........................ 260/586 R Primary Examiner—F. C. Edmundson
Attorney, Agent, or Firm—Hubbell, Cohen & Stiefel

[57] ABSTRACT

A process for preparing dihydroxycyclobutenedione ("squaric acid") and squaric acid complexes and salts which comprises electrochemical cathodic reductive cyclotetramerization of carbon monoxide to produce the squarate anion, while preventing anodic reactions from substantially interfering with the cathodic reductive reaction.

21 Claims, No Drawings

PROCESS FOR THE PREPARATION OF SQUARIC ACID BY REDUCTIVE CYCLOTETRAMERIZATION OF CARBON MONOXIDE

BACKGROUND OF THE INVENTION

1. Field of the Invention

The present invention relates to a process for the preparation of dihydroxycyclobutenedione, also known as "squaric acid," this compound having the formula:

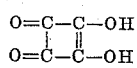

The invention also relates to the preparation of complexes of squaric acid with a metal such as Al, Mg, Cu, Fe, Mn, or In, and also to squaric acid salts.

More particularly, the present invention relates to the preparation of squaric acid and/or complexes of squaric acid, generally chelates, and/or squaric acid salts, by reductive electrolytic cyclotetramerization of carbon monoxide.

The resultant compounds have a number of industrial uses, e.g., as intermediates for the preparation of dyes (Angew. Chemie. Int. Ed. Vol. 5(1966) No. 10 pages 892–4), (Angew. Chemie. Int. Ed. Vol. 7(1968) No. 7 pages 530–535), polymers (British Pat. No. 1,067,084), and as sequestering agents (U.S. Pat. No. 3,059,030).

2. DESCRIPTION OF THE PRIOR ART

Squaric acid is a compound which was recognized and isolated only a few years ago.

Certain of the prior art methods for the preparation of squaric acid are based on the dimerization and/or cyclization of chloro(fluoro) olefins followed by ethyoxylation and hydrolysis.

Another method contemplates reacting hexachlorobutadiene with morpholine to obtain trichlorotrimorpholino-butadiene and then 3-morpholinotrichloro-1-cyclobutenone which, upon hydrolysis, will yield squaric acid. Squaric acid also may be obtained by reacting sulfur dioxide with octahydroxycyclobutane. (Khim. Ind. (Sofia) 1969 (2) pp. 69–71 —Todorov Obremen "Quadratic acid representative of a new aromatic system organic chemistry."

The foregoing processes have not been altogether satisfactory for industrial applications. Thus, the starting materials are frequently rather sophisticated or exotic and hence difficult to purchase and/or to synthesize. Moreover, the conditions for carrying out the known art processes require delicate conditions that are difficult to control on a commercial scale. Moreover, the yields that have been attained are not very satisfactory.

SUMMARY OF THE INVENTION

This invention provides a simple and economical process for the preparation of squaric acid, complexes of squaric acid with metals, and squaric acid salts, by electrochemical reductive cyclotetramerization of carbon monoxide.

The process of this invention comprises electrochemical reductive cyclotetramerization of carbon monoxide. Special operational conditions are observed in order to substantially avoid (1) oxidation in the anodic zone of the reduction products of carbon monoxide and (2) reduction in the cathodic zone of those products obtained from the anodic reaction. Thus, operational conditions are established so as to prevent the products of anodic oxidation and/or the anodic reaction itself from substantially interfering with the products of the cathodic reduction reaction or with the cathodic reduction reaction, and vice versa.

Since electrolytic reactions are involved, it will be evident that the harmful or parasitic reactions must be controlled such that they do not substantially interfere with the desired carbon monoxide reduction reaction. Hence, operational conditions are adopted whereby such harmful reactions are controlled so that they do not predominate over the desired reactions.

The process may be schemetically represented by the following reaction:

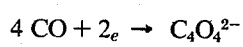

wherein: $e$ means "electron."

The squarate anion, $C_4O_4^{2-}$, obtained by cyclic tetramerization of CO, has the structure:

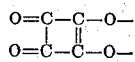

The squarate anion may be separated in the form of squaric acid and/or of its metal complexes and/or squaric acid salts, depending on the operational conditions chosen within the scope of the invention.

Thus, more particularly, the process for the preparation of squaric acid, its complexes with metals susceptible of complexing, or squaric acid salts, comprises subjecting carbon monoxide in a non-aqueous solution to reductive electrochemical cyclotetramerization under conditions of substantial separation or non-interference from the oxo reactions or of the products of the anodic reactions. This is followed by separation of the products by conventional techniques.

DESCRIPTION OF THE PREFERRED EMBODIMENTS

Reductive electrochemical cyclotetramerization of CO to the squarate anion can be achieved under a wide variety of operational conditions, e.g., as regards the nature of the electrodes (corrodable or non-corrodable), the nature of the solvents, and the use of direct or alternate current, so long as the above condition of substantial separation or non-interference of the anodic and cathodic reactions or of their products is observed.

There are two main embodiments for carrying out the reductive electrochemical cyclotetramerization of CO so as to obtain the squarate anion.

According to the first embodiment, reductive cyclotetramerization of CO in a non-aqueous solution is effected by the passage in said solution of electrical current flowing between two electrodes wherein the anode is made of a metal conductor that will be attacked (corroded) under the conditions of electrolysis, that is, will be transformed by anodic oxidation into the corresponding cation of the metal of which it is made, according to the equation: Me—Me$^{n+}$, wherein Me is the anode metal and is Mg, Al, Cu, Fe, Mn, In, or mixtures or alloys thereof, and wherein $n$, the valence of the metal, is from 1 to 3.

When the current is a direct current, the cathode can be made of any suitable electrically conductive material. On the other hand, when the current is an alternating current, then both the anode and the cathode are made of a metal conductor that is corrodable under the conditions of electrolysis.

In this embodiment, satisfactory separation of the products of the anodic and cathodic reactions takes place due to the fact that the squarate anion will form either a salt or a complex with the above mentioned metal cations, which salt or complex is virtually insoluble under the existing electrochemical reaction conditions and thereby is essentially inert, so that the preferential cathodic reduction of the CO will continue to take place.

According to the second embodiment of this invention, reductive cyclotetramerization of the CO in a non-aqueous solution is effected by the passage in said solution of either a direct or alternating current flowing between to electrodes, wherein the anode is made of material that is not attackable (corrodable) under the electrolysis conditions, for instance graphite, retort graphite, or metals which will not oxidize to their corresponding cations. The cathode may be made of any suitable electrical conductor.

In this case the maintenance of non-interference of the reactins and/or of the products from anodic oxidation with those derived from cathodic reduction and vice versa, may be achieved by selecting the best suited of a number of different conventional methods, the most common being described, for illustrative purposes, below.

For instance:
1. by separating the anodic space (anolite) from the cathodic space (catholite) by means of baffles or diaphragms;
2. by means of a forced circulation of the solution inside the cell in a direction that will hinder the admixing of the catholite with the anolite;
3. by selection of conditions so as to yield, from the reactions possible in the electrolytic reaction conditions involved by the process, the formation of chemically inert oxidation products;
4. by the formation by anodic oxidation of gaseous or liquid products that are continuously removable from the anolite;
5. by the formation of anodic oxidation products of such low solubility that they will not be carried to the cathode to any significant degree that would adversely effect the desired reduction of CO; or
6. by the formation of products that are substantially non-electrolites, etc.

Of course, combinations of these techniques are also possible.

As stated above, the foregoing second embodiment may be used with an anode made of any material that is not attackable under the electrolysis conditions. Examples of such materials include graphite, retort graphite, certain metals and metal alloys, etc.

Of course, certain of the specific techniques described with respect to the second embodiment may be utilized in practicing the first embodiment.

While direct current may be utilized with all the described alternative solutions for achieving the separation of the anodic space from the cathodic space and/or the non-interference of the corresponding reactions and/or of the products of such reactions, alternating current may be utilized only with items (3), (4), (5) and (6) of the second embodiment.

With regard to temperature, pressure, solvents, and auxiliary electrolytes, these parameters are considered below.

As solvents there preferably should be used compounds that permit the passage of current with a minimum of resistance, for obvious reasons of practicality and cheapness.

The solvent medium desirably comprises an amide of an aliphatic carboxylic acid having from 1 to 10 carbon atoms, which acid may be alkyl-, aryl-, or cycloalkyl-substituted; an amide of phosphoric acid; an aliphatic ether; a cyclic ether; a liquid polyether; anhydrous ammonia; or the like.

Particularly advantageous results have been obtained by using such solvents as dimethylformamide, tetrahydrofurane, the hexamethyl triamide of phosphoric acid (hexamethylphosphotriamide), bis-dimethoxydiethylether, anhydrous ammonia, and liquid polyethers derived from ethylene-, diethylene-, and triethylene glycol.

In order to enhance the conductivity of the solution there may be added thereto one or more auxiliary electrolytes, preferably an alkali metal halide, an alkaline earth metal halide, a quarternary ammonium halide (having alkyl, cycloalkyl, or aryl substituents or mixtures thereof), a halide of the metal making up the anode, etc.

The current density employed in the electrolysis reaction may vary over a wide range, depending on particular operational conditions employed.

the temperature should not be lower than about $-30°C$.

The pressure may be substantially atmospheric but preferably is higher, e.g., from about 4 to 400 atmospheres.

Separation and purification of the squaric acid and of the complexes is effected by techniques that are essentially conventional.

For instance, squaric acid is obtained by treatment of the dry residue of the reaction mixture with a non-oxidizing strong mineral acid (for example, HCl or $H_2SO_4$). The squaric acid thus obtained may be purified, as by first forming a cupric chelate and subsequently precipitating the Cu with $H_2S$, etc.

From the squaric acid there may be obtained both salts and complexes with those metals susceptible of salt formation or complexing, according to known techniques, as by reaction in solution with the salts of the desired cations, or by the direct preparation of the squarates and of the complexes by the use of corrodable anodes with direct current, or with corrodable electrodes when the current is alternating current, according to the first embodiment previously described.

The salts or the complexes obtained directly from electrolysis (such as the complexes of $Mg^{2+}$, $Al^{3+}$, $Cu^{2+}$, etc.) may be precipitated by dilution with a little $H_2O$ at 0°C, and by controlled acidification to a pH not less than about 3. The same technique is applicable to aqueous suspensions of the solid obtained from evaporative drying of the reaction mixture. Finally, alkaline salts of the squarate anion (or of the complex anion containing it) may be obtained by treating the raw dry residue with aqueous solutions of alkaline hydroxides.

The process, according to one preferred aspect, is carried out in the following manner, according to the first embodiment (with corrodable anode).

Into a pressure resistant electrolytic cell, fitted with a stirrer, there is introduced the chosen electrode system, in general consisting of a cylindrical aluminum anode and a stainless steel cathode which also serves as a container for the solution to be electrolized.

Into the cell there are introduced, under a nitrogen atmosphere, auxiliary electrolyte and solvent. The cell is then sealed, immersed in a bath with the temperature thermostatically stabilized at the desired value, and then carbon monoxide is charged to a predetermined pressure. Thereafter, direct current (or alternating current, depending on the particular method selected) is continuously passed through the solution for that period of time required by the reaction. Completion of the reaction is readily ascertained, e.g., by ascertaining the drop conductivity to a low value.

The current flow is then stopped, the cell is cooled down to room temperature, and the residual gas is discharged.

The electrolized suspension is then drawn out and distilled under reduced pressure.

The dry residue is treated with an excess of aqueous hydrochloric acid (e.g., 36%) and is filtered at 0°C. The residue consists of raw squaric acid. It is purified by treatment with an aqueous solution of cupric acetate and then by precipitation of the cupric complex salt of the squaric ion.

The precipitate thus obtained (cupric squarate) is filtered, washed and suspended in $H_2O$. It is treated with $H_2S$ until complete precipitation of the copper sulfide is achieved. After filtering under heat, the pure squaric acid is crystallized by cooling.

If one follows the second embodiment, described in detail hereinabove, that is, by using a non-corrodable anode, good results may be obtained as follows.

In a pressure resistant electrolytic cell there is arranged the preselected electrolytic system, generally consisting of a cylindrical graphite anode and a stainless steel cathode which also serves as a container for the solution to be electrolized.

The cathodic zone is fitted with a stirrer. Under a nitrogen atmosphere there are introduced into the cell auxiliary electrolyte and solvent. The cell is then sealed and immersed in a bath with the temperature thermostatically set to the desired value. CO is then charged until a predetermined pressure is attained. Direct current is then continuously passed through the solution for that period of time required for the reaction.

Upon completion of the reaction the current circulation is stopped, the gas is discharged, and the suspension present in the cathodic zone is removed.

The suspension is distilled at reduced pressure and the dry residue is treated with an aqueous solution of cupric chloride and then with a 15% solution of $NH_3$.

The suspended material is filtered and the clear solution is acidified with 30% HCl until a pH of about 4 is reached. This results in the precipitation of cupric squarate, which is then filtered, washed and suspended in diluted HCl. This suspension is then treated with $H_2S$ until complete precipitation of the copper sulfide is attained. After filtering under heat, the pure squaric acid is crystallized upon cooling.

The process of the invention, due to the simple operational conditions, the readily available sources of supply, and the inexpensiveness of carbon monoxide, is particularly advantageous.

The invention will be further illustrated by the following examples. All parts are by weight unless otherwise indicated.

EXAMPLE 1

A pressure-resistant electrolytic cell having a holding capacity of 300 cc and equipped with a magnetic-drive stirrer was employed. Inside the cell the electrode system was disposed. This system consisted of a cylindrical aluminum anode having a surface area of 20 sq. cm., and a hollow cylindrical stainless steel cathode having an internal diameter of 6 cm, the cathode also serving as the container for the solution to be electrolized.

Into the cell there was introduced, under a nitrogen atmosphere, a solution consisting of 200 cc of N,N-dimethylformamide and 3.5 g. of tetrabutylammonium bromide.

The cell was then sealed, dipped into a thermostatically stabilized bath, and was then charged with carbon monoxide until an equilibrium pressure of 120 atmospheres was reached at a temperature of 80°C. With a direct current feeder, a current flow of 100 mA was maintained in the cell for 75 hours while the voltage was maintained at around 3V and the pressure dropped to 75 atmospheres.

The current flow was then stopped, the cell was cooled to room temperature, and the residual gas was discharged. The electrolyzed solution was then discharged from the cell and treated with 65 cc of 36% aqueous HCl and filtered at 0°C. The residue consisted of raw squaric acid.

The raw squaric acid was purified by treatment with an aqueous solution of cupric acetate and by subsequent precipitation of the cupric complex salt of the squarate anion. The cupric salt was filtered, suspended in water and treated with $H_2S$ until complete precipitation of copper sulfide has occurred. After filtering under heat, upon cooling the squaric acid slowly crystallized. There was thus obtained 4 g. of squaric acid of high purity.

EXAMPLE 2

Using the same equipment and procedure described in Example 1, reductive cyclotetramerization of carbon monoxide was carried out, however with a starting pressure of 30 atmospheres. The system was electrolyzed until the final pressure amounted to 5 atmospheres.

By operating as in Example 1 there were obtained 1.2 g. of squaric acid.

EXAMPLE 3

Using the same equipment and procedure as described in Example 1, however at a temperature of 25°C, there were obtained 3.0 g. of squaric acid.

EXAMPLE 4

Using the same equipment and procedure as in Example 1, but using a magnesium anode, there was obtained 1 g. of squaric acid.

EXAMPLE 5

Using the same equipment and procedure as in Example 1, but with tetrahydrofurane as the solvent, during the electrolysis the current flow gradually dropped from 50 mA to 5 mA. There were obtained 2.1 g. of squaric acid.

EXAMPLE 6

This example illustrates direct separation from the raw reaction product of complex salts containing the squarate ion.

The cyclotetramerization reaction of carbon monoxide was carried out as described in Example 1. The raw reaction product, after a brief washing with N,N-dimethylformamide, was treated under stirring with 100 g. of ice and with concentrated hydrochloric acid so as to reduce the temperature to 0°C and to reduce the pH to about 3. The solution was permitted to stand overnight. There was then separated an abundant white-yellowish crystalline precipitate which was shown to be the coordination complex of the squarate anion with aluminum. 100 cc. of aqueous hydrochloric acid (36%). The suspension thus obtained was heated to boiling for 5 minutes. On cooling it to 0°C, raw squaric acid slowly crystallized.

The suspension was then filtered and, upon crystallization from water, there were obtained 8.1 g. of squaric acid.

EXAMPLES 8–18

The same apparatus and procedure described in Example 7 were employed, however varying such parameters as temperatures and pressures, auxiliary electrolytes (Examples 11, 12, 13 and 14), solvents (Examples 15 and 16), the anode (Example 17), and anode and solvent (Example 18).

In Table 1 there are recorded all the operational conditions as well as the results obtained.

TABLE 1

| Example No. | Temp. °C | Solvent, (g.) | Electrolyte (g.) | | Anode | Pressure, atm. | | Current, mA | Coulombs, circulation | Squaric acid (g.) |
|---|---|---|---|---|---|---|---|---|---|---|
| | | | | | | Starting | Final | | | |
| 8 | 85 | DMF 85 | Bu₄NBr | 3.5 | Al | 420 | 310 | 100 | 21,200 | 3.8 |
| 9 | −2 | DMF 91 | Bu₄NBr | 1.0 | Al | 3.8 | 1.4 | 50 | 13,500 | 0.3 |
| 10 | −16 | DMF 90 | Bu₄NBr | 1.0 | Al | 218 | 130 | 100 | 25,900 | 4.0 |
| 11 | 18 | DMF 85 | CaCl₂ | 1.0 | Al | 182 | 170 | 50–20 | 4,000 | 0.15 |
| 12 | 18 | DMF 95 | MgCl₂ | 1.5 | Al | 154 | 134 | 50 | 17,000 | * |
| 13 | 18 | DMF 90 | KBr | 0.5 | Al | 190 | 190 | 50 | 540 | 0.05 |
| 14 | 18 | DMF 90 | AlCl₃ | 1.0 | Al | 220 | 215 | 50–150 | 19,750 | * |
| 15 | 18 | HMPA 90 | Bu₄NBr | 1.0 | Al | 210 | 157 | 50 | 11,250 | 2.8 |
| 16 | 52 | Digl 91 | Bu₄NBr | 1.0 | Al | 220 | 210 | 10–5 | 1,200 | 0.1 |
| 17 | 18 | DMF 90 | Bu₄NBr | 1.0 | In | 205 | 200 | 50–5 | 2,700 | 0.05 |
| 18 | 87 | THF 110 | Bu₄NBr | 1.0 | Mg | 383 | 370 | 25–0.5 | — | * |

\* The presence of the squarate anion in the effluent product was revealed by the formation of the red-violet complex with the Fe(III) ion; and with the CU(II) ion was shown by the precipitation of small quantities of the yellow-green with cupric ion, quantitatively not determined.
DMF = N,N-dimethylformamide
HMPA = hexamethylphosphotramide
Digl = bis-dimethoxydiethylether
THF = tetrahydrofurane
Bu₄NBr = tetrabutylammonium-bromide In like manner, however utilizing a magnesium anode rather than an aluminum anode, there was obtained the complex of the squarate anion with magnesium.

EXAMPLE 7

This example was carried out using a pressure-resistant cell of 220 cc. holding capacity, fitted with a magnetic-drive stirrer, and into which was disposed the electrode system. This system consisted of a cylindrical aluminum anode having 13 sq. cm. surface area, and a stainless steel cathode, which also served as the container of the solution to be electrolized. The cathode had an internal diameter of 6 cm.

Into the cell there was introduced, under a nitrogen atmosphere, a solution consisting of 90 cc. of N,N-dimethylformamide and 1 g. of tetrabutylammonium bromide.

The solution was then thermostatically stabilized at 25°C and CO was charged in until an equilibrium pressure of 346 atmospheres had been reached. Through the cell there was then circulated a direct current of 100 mA for 78 hours, during which period the voltage was maintained at between 6 and 12 volts, while the pressure dropped to 205 atmospheres.

The current flow was then stopped and the residual gas was discharged. The electrolyzed solution was then removed from the cell and subjected to evaporation under reduced pressure. The residue was treated with

EXAMPLE 19

The same apparatus and procedure as described in Example 7 were employed, using however, two aluminum electrodes and feeding the cell with an alternating current having an $i_{effective}$ (effective intensity of the current) equal to 11 amperes for 2 hours. There was obtained 0.3 g. of squaric acid.

EXAMPLE 20

This sample shows preparation of the complex of the squarate ion with the cupric cation. The operational procedure was the same as described in Example 7, however using an anode of a copper-aluminum alloy (10% Al).

The raw reaction product was evaporated under reduced pressure and the dry residue was treated with an aqueous solution of ammonia at 15%. The suspension thus obtained was filtered and the liquid was brought to pH 4 with 30% HCl. There thus precipitated the cupric squarate. The product, after filtering and drying in the air, weighed 1.2 grams.

EXAMPLE 21

In this example a pressure-resistant electrolytic cell with a holding capacity of 220 cc. was used, with the electrode system disposed therein. This system consisted of a cylindrical graphite anode with a surface area of 20 sq. cm. and a hollow cylindrical stainless steel cathode which also served as a container for the solution to be electrolyzed.

The anodic zone was separated from the cathodic zone by a sintered glass diaphragm. The cathodic zone was fitted with a magnetic drive stirrer revolving at about 70 rpm.

Into the cell there were introduced, under a nitrogen atmosphere, 0.5 g. of potassium bromide and 90 g. of N,N-dimethylformamide.

The cell was then sealed, but into a thermostatically stabilized bath maintained at 20°C, and was then charged with CO until an equilibrium pressure of 158 atmospheres was obtained.

For 2.5 hours there was passed through the cell a current of 50 mA while the voltage was maintained at about 20 V.

The current circulation was then stopped, the gas discharged, and the suspension present in the cathodic zone was drawn out. This suspension was then subjected to distillation under reduced pressure. The dry residue was treated with an aqueous cupric chloride solution and then with an aqueous 15% ammonia solution. The suspended material was removed by filtering and the clear solution was acidified to a pH 4 with 30% HCl. There was thus precipitated a yellow-green cupric squarate which was filtered, washed, suspended in dilute HCl, and then treated with $H_2S$ until complete precipitation of copper sulfide had occurred. After filtering under heat, on gradual cooling there slowly crystallized 0.12 g. of squaric acid of high purity.

EXAMPLE 22

In the same apparatus and with the same procedure as described in Example 21, using however, an aluminum anode and 1 g. of tetraethylammonium-bromide as the auxiliary electrolyte, there was obtained 0.12 g. of squaric acid.

EXAMPLE 23

The same apparatus and the same procedure as in Example 21 were utilized, using however a zinc anode and using tetrabutyl-ammonium-bromide as the auxiliary electrolyte. The initial voltage was 25V with a circulation of 200 Coulombs. There was thus obtained 0.04 g. of squaric acid.

EXAMPLE 24

In the same apparatus and with the same procedure as described in Example 21, however using 0.18 g. of $AlCl_3$ and 1 g. of tetrabutylammonium bromide as electrolytes, there was obtained 0.1 g. of squaric acid.

EXAMPLE 25

In this example there was used a pressure-resistant electrolytic cell with a holding capacity of 220 cc., fitted with a magnetic-drive stirrer, and in which was placed the electrode system. This system consisted of a disc of very pure aluminum, having a diameter of 50 mm and a thickness of 1 mm, which disc served as the anode, and a lower disc-shaped aluminum mesh disposed three millimeters beneath the anode and connected electrically with the body of the autoclave acting with it as the cathode.

Into the autoclave was then introduced 1 g. of tetrabutylammonium-bromide and the cell was then sealed. Into the cell was then introduced under pressure 60 g. of liquid $NH_3$. CO was then charged until an equilibrium pressure of 187 atmospheres had been reached at 0°C.

A direct current of between 50 and 100 mA was fed in for 24 hours, so that a total of 4600 Coulombs circulated. The gases were discharged with a recovery of $NH_3$.

On opening the cell there was obtained a white-yellowish solid residue weighing 3 g. which, by acidification with concentrated HCl, yielded 0.8 g. of squaric acid.

Variations can, of course, be made without departing from the spirit of the invention.

Having thus described the invention, what is desired to be secured by Letters Patent and hereby claimed is:

1. A method for preparing squaric acid, its complexes, or its salts, said method comprising passing electric current through a solution of carbon monoxide in a solvent selected from the group consisting of amides of phosphoric acid, amides of carboxylic aliphatic acids having from 1 to 10 carbon atoms, aliphatic ethers, cyclic ethers, liquid polyethers and anhydrous ammonia at a temperature of from about −30°C to a temperature up to the boiling point of said solvent at pressures up to about 420 atm. to thereby effect electrolytic cathodic reductive cyclotetramerization of said carbon monoxide, this reaction being carried out under conditions of substantial separation or non-interference of the anodic reactions and reaction products from the cathodic reactions and reaction products.

2. The method of claim 1 wherein direct current is employed.

3. The method of claim 1 wherein alternating current is employed.

4. The method of claim 2 wherein the anode is made of a conductive metal that is corrodable under the electrolysis conditions.

5. The method of claim 4 wherein the conductive metal is Mg, Al, Cu, Fe, Mn, In, alloys thereof, or mixtures thereof.

6. The method of claim 3 wherein each of the anode and the cathode is made of a conductive metal that is corrodable under the electrolysis conditions.

7. The method of claim 6 wherein the conductive metal is Mg, Al, Cu, Fe, Mn, In, alloys thereof, or mixtures thereof.

8. The method of claim 2 wherein the anode is made of a metal conductor that is not corrodable and is substantially chemically inert with respect to the electrolysis conditions.

9. The method of claim 8 wherein separation of the catholite from the anolite is effected by baffles or diaphragms.

10. The method of claim 8 wherein operation of the catholite from the anolite is achieved by separately circulating each of them.

11. The method of claim 1 wherein the non-interference of the reaction products in the catholite with those in the anolite is achieved through the formation of anodic oxidation products which are chemically inert under the electrolysis conditions.

12. The method of claim 1 wherein the non-interference of the reaction products in the catholite with those in the anolite is achieved through the formation of anodic oxidation products which are insoluble in the reaction medium.

13. The method of claim 1 wherein the non-interference of the reaction products in the catholite with those in the anolite is achieved through the formation and continuous removal of anodic oxidation products from the anodic zone.

14. The method of claim 13 wherein the anodic oxidation products are liquid.

15. The method of claim 13 wherein the anodic oxidation products are gaseous.

16. The method of claim 1 wherein the anodic oxidation products are substantially non-electrolytes.

17. The method of claim 1 wherein the solvent is dimethylformamide, tetrahydrofurane, hexamethylphosphotriamide, bis-dimethoxydiethylether, or anhydrous ammonia.

18. The method of claim 1 wherein there is additionally present as an auxiliary electrolyte, an alkali metal halide, an alkaline earth metal halide, an alkyl-, cycloalkyl-, or aryl-quaternary ammonium halide, a halide of the metal forming the anode, or mixtures therof.

19. The method of claim 1 carried out at a temperature not lower than about $-30°C$.

20. The method of claim 1 carried out at at least substantially atmospheric pressure.

21. The method of claim 20 wherein the pressure is from about 4 to 400 atmospheres.

* * * * *

PO-1050
(5/69)

UNITED STATES PATENT OFFICE
CERTIFICATE OF CORRECTION 201-54

Patent No. 3,833,489            Dated September 3, 1974

Inventor(s) Raffaele Ercoli et al

It is certified that error appears in the above-identified patent and that said Letters Patent are hereby corrected as shown below:

Title page, left-hand column, "Foreign Application Priority Data": "42019/71" and "25273/72" should read -- 42019 A/71 -- and -- 25273 A/72 --.

Column 1, line 53: "known art processes" should read -- known processes --.

Column 2, line 10: "that the harmful" should read -- that harmful --.

Column 3, line 20: "between to electrodes" should read -- between two electrodes --.

Column 3, line 27: "reactins" should read -- reactions --.

Column 4, line 34: "the temperature" should read -- The temperature --.

Columns 7-8, Table 1, the footnote, line 2: "yellow-green with cupric ion" should read -- yellow-green complex with cupric ion --.

Column 8, line 53: "however using" should read -- using however --.

Column 9, line 13: "obtained" should read -- attained --.

Signed and sealed this 18th day of March 1975.

(SEAL)
Attest:

RUTH C. MASON
Attesting Officer

C. MARSHALL DANN
Commissioner of Patents
and Trademarks